United States Patent
Mitchell et al.

(10) Patent No.: US 9,932,547 B2
(45) Date of Patent: Apr. 3, 2018

(54) FERMENTATION MONITORING AND MANAGEMENT

(71) Applicant: PicoBrew, LLC, Seattle, WA (US)

(72) Inventors: William H. Mitchell, Medina, WA (US); James B. Mitchell, Seattle, WA (US)

(73) Assignee: PicoBrew, Inc., Seattle, WA (US)

( * ) Notice: Subject to any disclaimer, the term of this patent is extended or adjusted under 35 U.S.C. 154(b) by 94 days.

(21) Appl. No.: 14/814,567

(22) Filed: Jul. 31, 2015

(65) Prior Publication Data

US 2017/0029752 A1    Feb. 2, 2017

(51) Int. Cl.
     *C12C 11/00*      (2006.01)
     *C12C 13/10*      (2006.01)

(52) U.S. Cl.
     CPC ............ *C12C 11/00* (2013.01); *C12C 11/003* (2013.01); *C12C 13/10* (2013.01)

(58) Field of Classification Search
     CPC ........ C12C 11/00; C12C 11/003; C12C 13/10
     See application file for complete search history.

(56) References Cited

U.S. PATENT DOCUMENTS

2015/0161871 A1*    6/2015    Kim ...................... G08B 21/18
                                                                  340/539.12

OTHER PUBLICATIONS

Ken Schwartz, Son of Fermentation Chiller or, "Better Late than Never . . . ", pp. 1-14, 1997.*

* cited by examiner

*Primary Examiner* — Shogo Sasaki
(74) *Attorney, Agent, or Firm* — Russell Krajec; Krajec Patent Offices, LLC

(57) ABSTRACT

A fermentation monitoring system may measure the weight of a fermenting product to determine the progress of fermentation. The weight of a fermenting batch may decrease as carbon dioxide is given off, and a continuous or periodic weight measurement may be used as a control input to a fermentation system, which may adjust temperature to control fermentation or detect that fermentation is not progressing as expected. Such a system may be to use a weight scale attached to a fermentation vessel and have a control system capable of adjusting the temperature of the fermenting contents. One implementation may have a scale mounted inside a temperature controlled fermentation cabinet.

9 Claims, 5 Drawing Sheets

FERMENTATION MONITORING AND MANAGEMENT

BACKGROUND

Fermentation is a process used in multiple food products, including beer, wine, and several other beverages. During the fermentation process, yeast consumes sugars and produces alcohol and carbon dioxide. In some fermentation processes, such as with beer making, the yeast may consume all or a very high percentage of certain sugars and at that point most of the yeast may die off or go dormant.

Fermentation may be dependent on temperature. Certain yeast strains may perform differently at different temperatures, and in general fermentation temperatures are selected to optimize the results of the fermentation. In some situations, higher temperatures may produce unwanted byproducts or off flavors, while lower temperatures may take an impractical amount of time to complete fermentation.

When the fermentation process is properly managed, a consistent product may be produced from batch to batch in a reasonable and predictable amount of time.

SUMMARY

A fermentation monitoring system may measure the weight of a fermenting product to determine the progress of a fermentation. The weight of a fermenting batch may decrease as carbon dioxide is given off, and a continuous or periodic weight measurement may be used as a control input to a fermentation system, which may adjust temperature to control fermentation or detect that fermentation is not progressing as expected. Such a system may be to use a weight scale attached to a fermentation vessel and have a control system capable of adjusting the temperature of the fermenting contents. One implementation may have a scale mounted inside a temperature controlled fermentation cabinet.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings,

FIG. 1 is not to scale.

DETAILED DESCRIPTION

Fermenting Monitoring and Management for Beermaking

Figure 1:
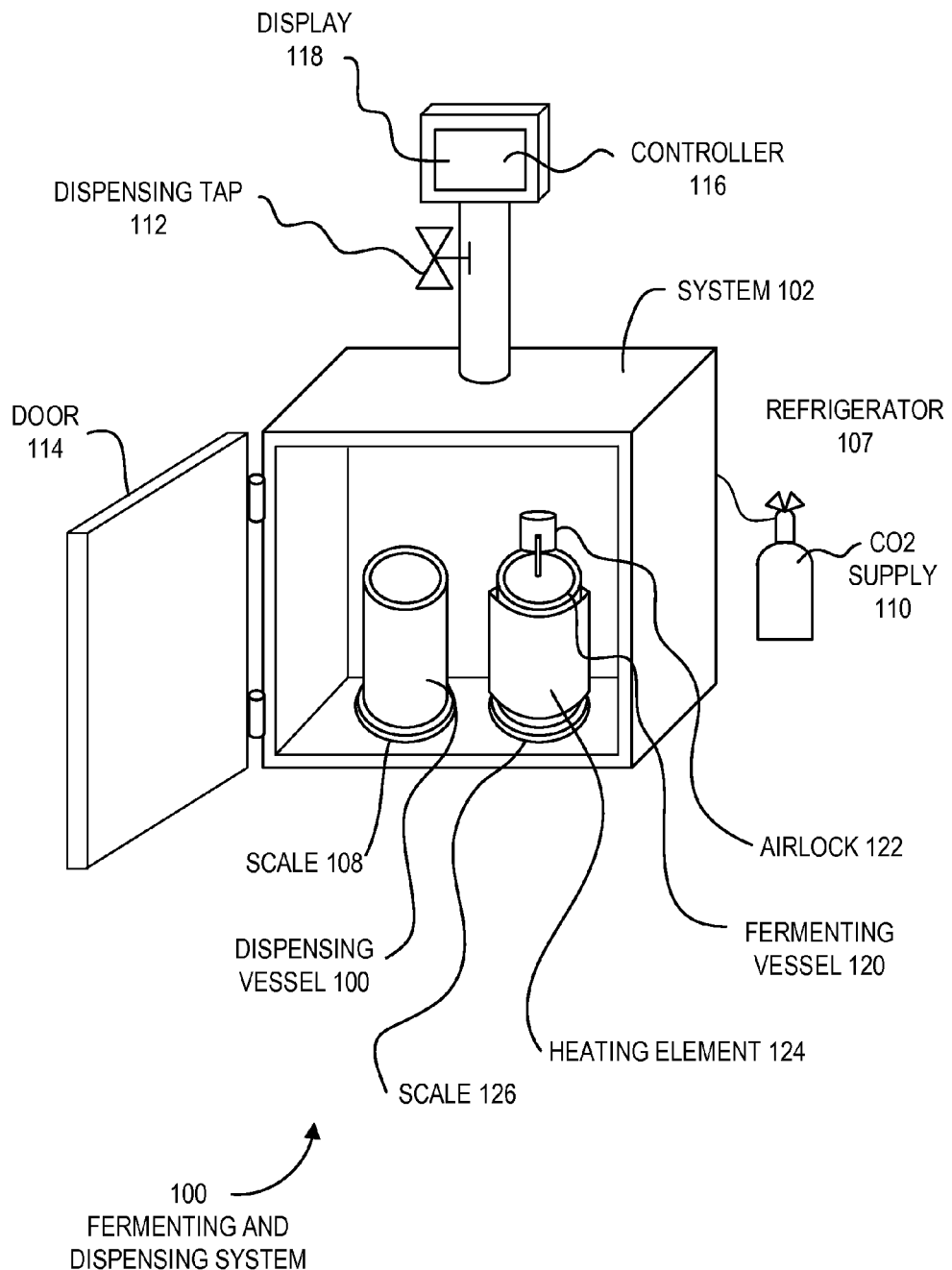
FIG. 1 is a diagram illustration of an embodiment showing a fermentation and dispensing system.

A fermenting system may use weight as a control input to determine the fermentation progress. A fermentation vessel may be mounted on a scale, load cell, or other mechanism that may measure weight, and a monitoring system may collect the weight data to determine fermentation progress. In some cases, the monitoring system may also control heat or other output that may affect the fermentation performance.

Fermentation gives off carbon dioxide ($CO_2$), which reduces the weight of a fermenting liquid. By measuring the weight of the fermenting liquid, an approximate measurement of the fermentation progress may be made. The weight may be an indirect measurement of fermentation progress, but may be a lower cost measurement than other, more direct ways of measuring fermentation progress.

A fermentation management system may monitor the weight of a fermenting vessel during fermentation to determine whether or not fermentation may be progressing as expected. When a fermentation batch may not be progressing as fast as expected, the fermentation management system may increase temperature or perform some other corrective action. In some cases, the fermentation may progress too rapidly and the system may decrease temperature, for example. The fermentation management system may determine when a fermentation batch may have a problem and may provide alerts to a human operator to address.

The fermentation management system may use a function or curve that can be used to calculate an anticipated or expected weight. Fermentation performance often varies with the starting conditions, and from batch to batch. Each fermentation process may begin sooner or later than another, but once the fermentation reaches a certain rate, each fermentation process may proceed generally similarly.

The starting conditions may include the initial temperature of the sugars contained in the liquid, often known as wort in the beer making trade, as well as the temperature, yeast density, and activity of the yeast in a yeast suspension that is added or pitched into the wort. In some cases, yeast activity may be measured within minutes of pitching, while in other cases, yeast activity may take many hours before it becomes measurable. However, once activity is measured, fermentation in a controlled environment often performs predictably.

The fermentation management system may monitor the rate of change of weight for a fermenting vessel. As the yeast activity increases, the rate of change of weight may increase as more $CO_2$ is released and the weight of the contents of the vessel decreases. As fermentation activity slows down, the rate of change of the weight may decrease and eventually stop. The fermentation system may identify a completion point for fermentation and may alert a human operator or may continue with further processing.

The fermentation management system may identify abnormalities in the fermentation process. An abnormality may be any inconsistency with an anticipated fermentation process, such as fermentation beginning too early or too late, fermentation progressing too rapidly or too slowly, fermentation ending too early or too late, or some other abnormality. Such an abnormality may trigger an alert for a human operator or may cause some other corrective action to be taken.

Two Zone Temperature Management for Beer Manufacturing

A beer serving and fermentation device may have a refrigerated compartment in which beer vessels may be stored. The refrigerated compartment may be set to a first temperature, yet one or more of the vessels may have a heat blanket that may be cause the wrapped vessel to be at a higher temperature than the refrigerated compartment. The wrapped vessel may be controlled at a second, higher temperature for beer fermentation, while other vessels in the same compartment may be at a lower temperature for serving, for example.

A controller may control the temperature of a fermenting vessel with a heating element inside a refrigerated compartment. The controller may increase or decrease the temperature of the fermenting vessel at various stages of the fermenting cycle, and may finish a fermentation cycle by allowing the fermenting vessel to chill to the temperature of the refrigerated compartment.

Fermentation Schedules Derived from Many Measurements

A system may manage fermentation schedules by collecting data points from users at various points in the fermentation process. The information may include specific gravity of the fermenting liquid, as well as the temperature, vessel weight, or other data. These data may be aggregated and analyzed to determine a performance model for fermenting.

The system may analyze an ingredients list and mashing schedule to estimate fermentation performance. The performance estimate may be made in part from a mathematical model that may be developed from data points gathered by previous fermentation processes, and such data points may be gathered by multiple people using different or similar hardware systems.

A user interface may receive a user's measurement for a fermentation process, such as a gravity measurement, and may store the user's measurement in a database along with various recipe parameters. A system may provide a timestamp for the measurement and may correlate the timestamp to a start time or other reference point for the fermentation process.

A centralized server may collect data points from multiple users and store the data points in a database. Regression analysis or other analyses may be run over the data to generate a fermentation function that may express the anticipated fermentation performance for a given recipe and yeast.

A fermentation management system may request a fermentation function from the centralized server by transmitting a recipe definition, which may include a yeast identifier, and may receive a fermentation function from which the anticipated fermentation performance may be calculated during the fermentation process.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram illustration of an embodiment 100 showing a fermenting and dispensing system. Embodiment 100 is a simplified illustration of a beer fermenting and dispensing system 102 that may be used in a residential or commercial setting.

Embodiment 100 illustrates a system 102 that has a refrigerator 104 inside which one or more vessels may be placed. The vessels may be kegs or other containers that may be used for dispensing or for fermenting. The vessels may be connected by various hoses for pressurizing the containers with carbon dioxide, nitrogen, or other gasses, as well as liquid distribution hoses.

Multiple temperatures may be desired in some situations, and different vessels may be kept at different temperatures. Such a situation may occur when one beer style may be dispensed at a lower temperature than another, or when one vessel is undergoing fermentation at a higher temperature than another vessel in the same refrigerated compartment.

A heating element 124 may be applied to one or more of the vessels and may be controlled independent of the temperature of the other vessels. Each heating element 124 may have a temperature sensor, such as a thermocouple, that may detect the temperature of the vessel, as well as a set of heating elements. In many cases, the heating elements may be electric elements, although steam or other heat source may be used in other cases.

During multiple temperature use, the refrigerated compartment may be kept at or below the lowest temperature of the various vessels. Each vessel may have an independently controlled heating element 124 that may raise the temperature of the specific vessel to a desired temperature.

The heating element 124 may be a removable sleeve that may conform to the vessel and may include thermocouples, heating elements, connections to a power source, and other components. In some cases, the heating element 124 may be a stretchable, flexible material that may be wrapped around the vessel and attached using hook and loop or other fastening mechanisms.

The term "heating element" is used as a descriptive term for a particular embodiment, but also includes any other controllable heating mechanism that may be used to separately control the temperature of a vessel inside the refrigerated compartment. For example, a vessel may have a permanently mounted heating coil that may be separately controllable. In another example, a vessel may have an immersion heater that may be separately controllable. In some embodiments, the "heating element" may chill the contents of the vessel to which it may be applied.

A heating element 124 may have a controller that may receive a temperature input and may cause the heating element to activate, thereby controlling the temperature of the liquid inside the vessel. The controller may be mounted on the system 102, or may be mounted on the vessel. In some cases, the controller may be mounted on a removable heating element that may be applied to a vessel.

The system 102 is illustrated with a dispensing vessel 106 inside the refrigerator 104. The refrigerator 104 is illustrated as having a door 114 that is open for the purposes of illustration. The dispensing vessel 106 may be pressurized using a carbon dioxide supply 110. The carbon dioxide supply 110 may be used to force carbonate a beverage in the dispensing vessel 106, as well as to cause the liquid to be dispensed through a dispensing tap 112.

A scale 108 may be mounted under the dispensing vessel 106. The scale 108 may be used to determine how full the dispensing vessel 106 may be, so that a controller 116 and display 118 may display the level. In some cases, the controller 116 and display 118 may determine an approximate number of servings that may remain in the dispensing vessel 106.

A fermenting vessel 120 may be mounted on a scale 126. The fermenting vessel 120 may be outfitted with an airlock 122 and a heating element 124.

The scale 126 under the fermenting vessel 120 may be used to monitor the progress of a fermentation process. During fermentation, carbon dioxide is given off, causing the weight of the fermenting vessel 120 to decrease. The decrease is measurable enough to be used as a proxy for fermentation progress.

A controller 116 may receive continuous or periodic weight measurements from the scale 126 to monitor fermentation progress. In some cases, the controller 116 may also send output signals to the heating element 124 to increase or decrease temperature of the fermenting vessel 120 in response to the fermentation progress.

Figure 2:
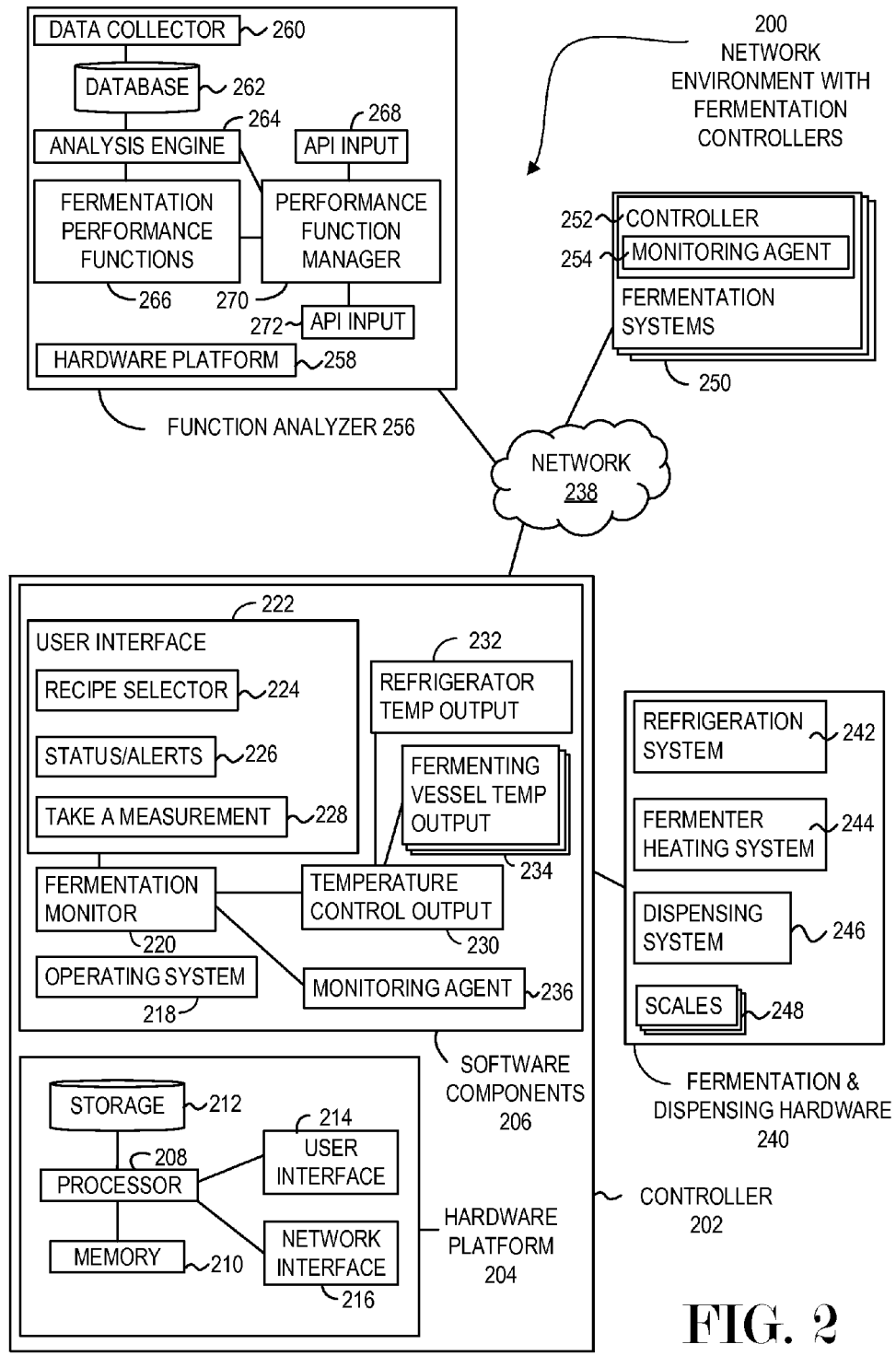
FIG. 2 is a diagram illustration of an embodiment showing a schematic or functional representation of a network with a fermentation and dispensing system.

FIG. 2 is a diagram of an embodiment 200 showing components that may manage fermentation and dispensing of beverages. The various components may be connected by a network 238.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a controller 202 that may have a hardware platform 204 and various software components. The controller 202 as illustrated represents a conventional computing device, although other embodiments may have different configurations, architectures, or components.

In many embodiments, the controller 202 may be a server computer. In some embodiments, the controller 202 may still also be a desktop computer, laptop computer, netbook computer, tablet or slate computer, wireless handset, cellular telephone, game console or any other type of computing device. In some embodiments, the controller 202 may be implemented on a cluster of computing devices, which may be a group of physical or virtual machines.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the controller 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate.

The controller 202 may be a controller that may integrate various hardware components, such as the fermentation and dispensing hardware 240, which may represent various components illustrated in embodiment 100. The fermentation and dispensing hardware 240 may include a refrigeration system 242, a fermenter heating system 244, a dispensing system 246, several scales 248, and other components.

The controller 202 may manage the fermentation process as well as control and monitor the dispensing of beverages. When monitoring beverage dispensing, the controller 202 may display the beverage name or other information on a display, as well as display the quantity of beverage in a dispensing vessel.

The controller 202 may have a fermentation monitor 220, which may interact with a user interface 222, temperature control outputs 230, and a monitoring agent 236.

The user interface 222 may include a recipe selector 224 where a user may input or select a recipe that may be fermented. From a given recipe, an estimated amount of sugars that may be present in the fermenting liquid, along with a yeast selection, may be used to predict fermentation performance. Such a prediction may be used to determine whether the fermentation is progressing as expected, whether adjustments to temperature or other control outputs may be made, when fermentation has completed, or other information.

In some embodiments, a recipe selector 224 may be connected to a brewing system that may have been used to brew wort for fermentation. Some brewing systems may have a programmable controller that may communicate to the controller 202 to download a recipe.

The recipe selector 224 input may cause the recipe to be associated with a vessel, whether the vessel may be used for fermenting or dispensing. When being used for dispensing, various recipe information may be displayed to a user, such as the recipe name, alcohol content, bitterness, flavor profile, brewing statistics, brewer name, or other information about the recipe or the specific batch.

The user interface 222 may include various status or alerts 226 that may be communicated to a user. In many cases, the status or alerts 226 may be displayed on a fermentation or dispensing system display. In some cases, a status or alert may be transmitted to a user through other mechanisms, such as text messaging, electronic mail, or other mechanism.

The take a measurement option 228 may be a user interface component where data may be collected. A typical use scenario may be for a user to take a direct measurement of specific gravity, for example, and input the reading. Such a reading may have metadata added to it, automatically or manually, such as time and date of the reading, elapsed time from beginning of fermentation, recipe information, and other information. Such a reading may be used to monitor fermentation performance as well as to build or improve a fermentation performance model.

Data collection from multiple devices, such as the controller 202 and various other fermentation systems 250 may be used to develop a set of fermentation models by using a function analyzer 256. The fermentation systems 250 may be similar to the controller 202 and its set of fermentation and dispensing hardware 240, with a controller 252 and monitoring agent 254. As each of the fermentation systems 250 may collect data from each fermentation process, these data may be transmitted to the function analyzer 256. The data may include weight measurements collected from scales on which a fermentation vessel may rest, as well as various manual measurements taken by users, such as specific gravity measurements.

The function analyzer 256 may have a data collector 260, which may receive data from various fermentation systems 250, including the fermentation monitor 220 of controller 202. The collected data may be stored in a database 262.

An analysis engine 264 may perform various analyses to generate fermentation performance functions 266. The fermentation performance functions 266 may be mathematical expressions of a fermentation process. Some such functions may have inputs such as sugar content, yeast selection, temperature, and other variables, and may output an expected rate of sugar conversion, time to completion, or other parameters.

The fermentation performance functions 266 may be used by the fermentation monitor 220 to determine various parameters about the fermentation process. In a simple version, the fermentation monitor 220 may determine an estimated completion time for a fermentation process. Such an analysis may also determine the estimated weight loss of the fermenting liquid and the fermentation monitor 220 may determine that fermentation has completed when the actual weight loss compares with the estimated weight loss.

In a more complex version, the fermentation monitor 220 may calculate expected weight change and may adjust fermentation temperature or other process variables to adjust the actual weight change to attempt to match a desired fermentation plan.

A fermentation monitor 220 may communicate with a function analyzer 256 to retrieve a fermentation performance function. In many cases, the fermentation manager 220 may transmit various recipe information to the function analyzer 256, which may receive such information through an Application Programming Interface input 268. A performance function manager 270 may retrieve a fermentation performance function 266 and transmit it through an API output 272 to the fermentation manager 220.

The fermentation manager 220 may use a fermentation performance function to determine fermentation progression and may adjust temperatures within the system through a temperature control unit 230. The temperature control unit 230 may generate refrigerator temperature output 232 which may be connected to the refrigeration system 242. The temperature control unit 230 may also generate fermenting vessel temperature outputs 234, which may be connected to the various fermenter heating systems 244.

Embodiment 200 illustrates a configuration where a remote function analyzer 256 may distribute fermentation performance functions. Such embodiments may be useful to centralize the fermentation performance functions so that the functions may be derived from results collected from many users. A centralized system may be able to collect performance data across many fermentation systems, and the analysis of such a large amount of data may result in more accurate and useful performance data and models.

In the illustrated embodiment, the controller 202 may perform calculations using a fermentation performance function to calculate various expected parameters of a fermentation session. For example, the controller 202 may determine an expected weight of a fermentation vessel given parameters such as the batch size and other parameters.

In some embodiments, a remote system may perform such calculations. In such an embodiment, a controller 202 may transmit parameters of a fermentation process to the API input 268 and may receive values, such as the expected weight or weight change of the fermenting vessel. In still other embodiments, the controller 202 may transmit raw measurements to a remote system, which may return control parameters, such as adjustments to temperature settings or completion indicators for a fermentation process.

Some embodiments may include some or all of the functionality of the function analyzer 256 into the controller 202. In such embodiments, the controller 202 may collect data from each fermentation process and, in some cases, use such data to refine or improve a fermentation performance function.

In each of the embodiments discussed above, various parts of the monitoring and control aspects of a fermentation process may be performed by local or remote devices. Some applications may call for fermenting devices that may have a minimum of complexity and computing power, and such applications may use a centralized remote system to perform many of the various functions. Other applications may have sufficient computing power and complexity in the controller 202, which may allow for some functions to be performed on a local device rather than a remote device. In some cases, such as in a fermentation system used within a commercial brewery, the fermentation performance functions 266 and other data may be considered proprietary and may be developed, analyzed, and consumed within the brewery without sharing with competitors or other brewers.

Figure 3:
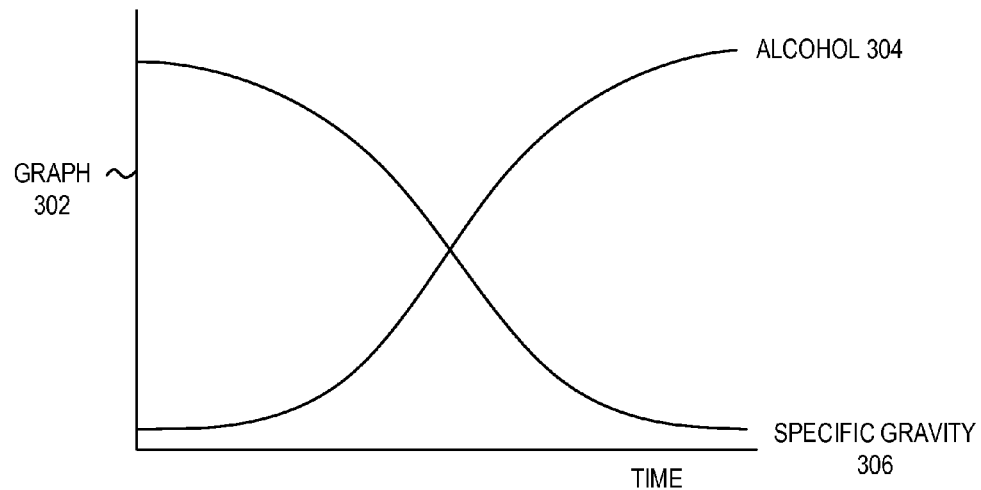
FIG. 3 is a diagram illustration of graphs that illustrate a fermentation process over time.
Figure 3:
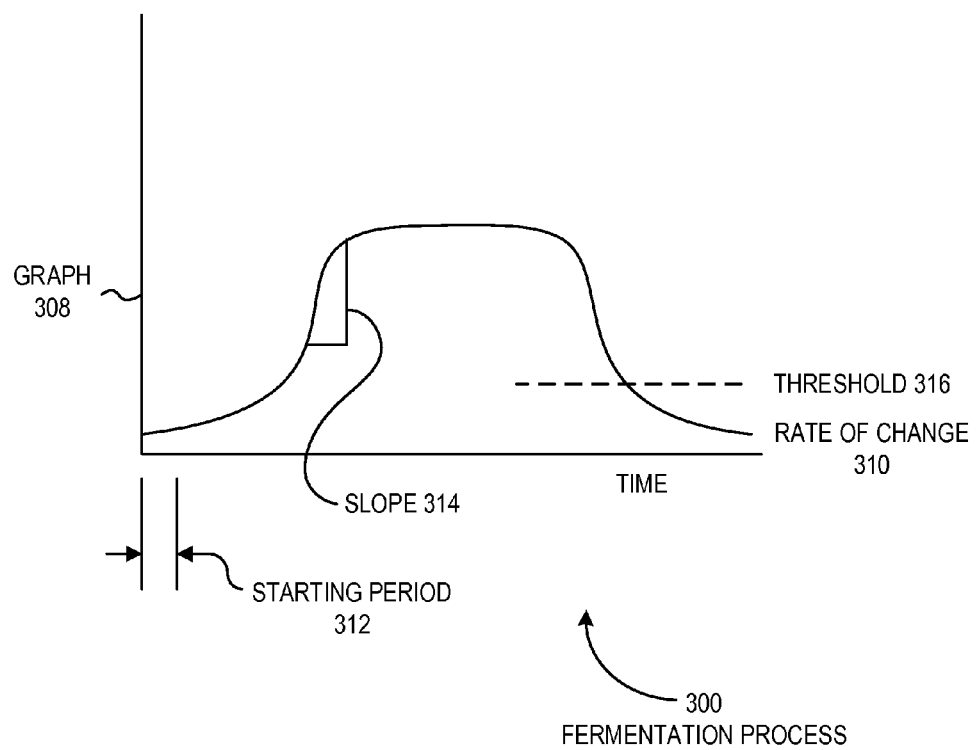

FIG. 3 is a diagram illustration of a graph 302 and graph 308 showing a pictorial representation of a fermentation process. The graphs are not to scale and are used to illustrate how a typical fermentation process may operate and some example data elements that may be used by a fermentation controller.

Graph 302 may illustrate a fermentation process over time. A curve showing the alcohol 304 produced during the process may be shown along with the specific gravity 306, which is a common metric used in the brewing trade and refers to the current density of the fermenting liquid.

During a fermenting process, yeast consumes sugars in the liquid and produces alcohol and carbon dioxide. As the alcohol is produced, the specific gravity 306 goes down, and, as the carbon dioxide is given off, the overall weight of the fermenting liquid decreases accordingly.

By measuring the weight of a fermenting liquid, the specific gravity and alcohol content may be inferred. Weight is not a direct measurement of alcohol or specific gravity, but has been found to be directly correlated. In a home brewing scenario where 2-5 gallons of beer may be produced, the weight change before and after fermentation has been measured in multiple ounces, which is enough variation to be detected with sufficiently sensitive scales.

A fermenting system may use weight as a proxy or secondary indicator of fermentation progress. The rate of change of weight has been found to be directly correlated to the rate of change of specific gravity, and thus can be used to determine progression of a fermentation process as well as indicate when the fermentation process has completed.

Graph 308 may illustrate the rate of change 310 of weight or specific gravity of a fermentation process. The rate of change 310 begins slowly, then increases to a somewhat steady state, then falls off as fermentation completes. Fermentation often ends when the sugars have been consumed and, in some cases, because the yeast may not tolerate the high alcohol content.

When monitoring a fermentation process, a controller may identify a starting period 312 that may occur from when the yeast may be pitched or added to the liquid to the point where detectable change begins. In many cases, a relatively small amount of yeast may be added, and those yeast may begin reproducing. Depending on the starting conditions, yeast health, and other factors, the starting period 312 may vary from one batch to another. In general, a brewer may wish to minimize the starting period 312 because foreign yeasts or other biological contaminants may have a chance to infect the fermenting liquid prior to the desired yeast becoming dominant.

As the fermentation progresses, the rate of change 310 may reach a maximum slope 314, which may be the point where yeast propagation maximizes. The maximum slope 314 may be one indicator that may be used to characterize fermentation progress.

Near the end of the fermentation process, the rate of change 310 may drop below a threshold 316. The threshold 316 may be a point where the sugars may have been nearly exhausted and the fermentation process may be considered complete. As the rate of change 310 has passed the threshold 316, a controller may determine that the fermentation process has completed or is nearly complete, and may alert a user or take some other action.

A fermentation performance function may be a mathematical expression that may represent one or more of the various curves illustrated in embodiment 300. The curves may be used by a controller to determine whether or not fermentation is progressing as expected.

When a heating control system may be available, a controller may adjust the temperature of a fermenting liquid to be higher or lower to attempt to control the fermenting process to correspond to a fermentation performance function. For example, if a controller fails to detect activity during a starting period 312, the controller may increase the temperature of the fermenting liquid to help the yeast activity. The controller may detect that the slope 314 of the rate of change 310 may be higher or lower than expected, and may adjust the temperature accordingly.

In the example of embodiment 300, the notion of rate of change 310 is used as one example of how a fermentation process may work and as an example of how a controller may monitor progression of a fermentation process. Such an example is merely one method of monitoring and controlling a fermentation process and other embodiments may use other indicators or parameters for monitoring and controlling a fermentation process, such as adding oxygen.

Figure 4:
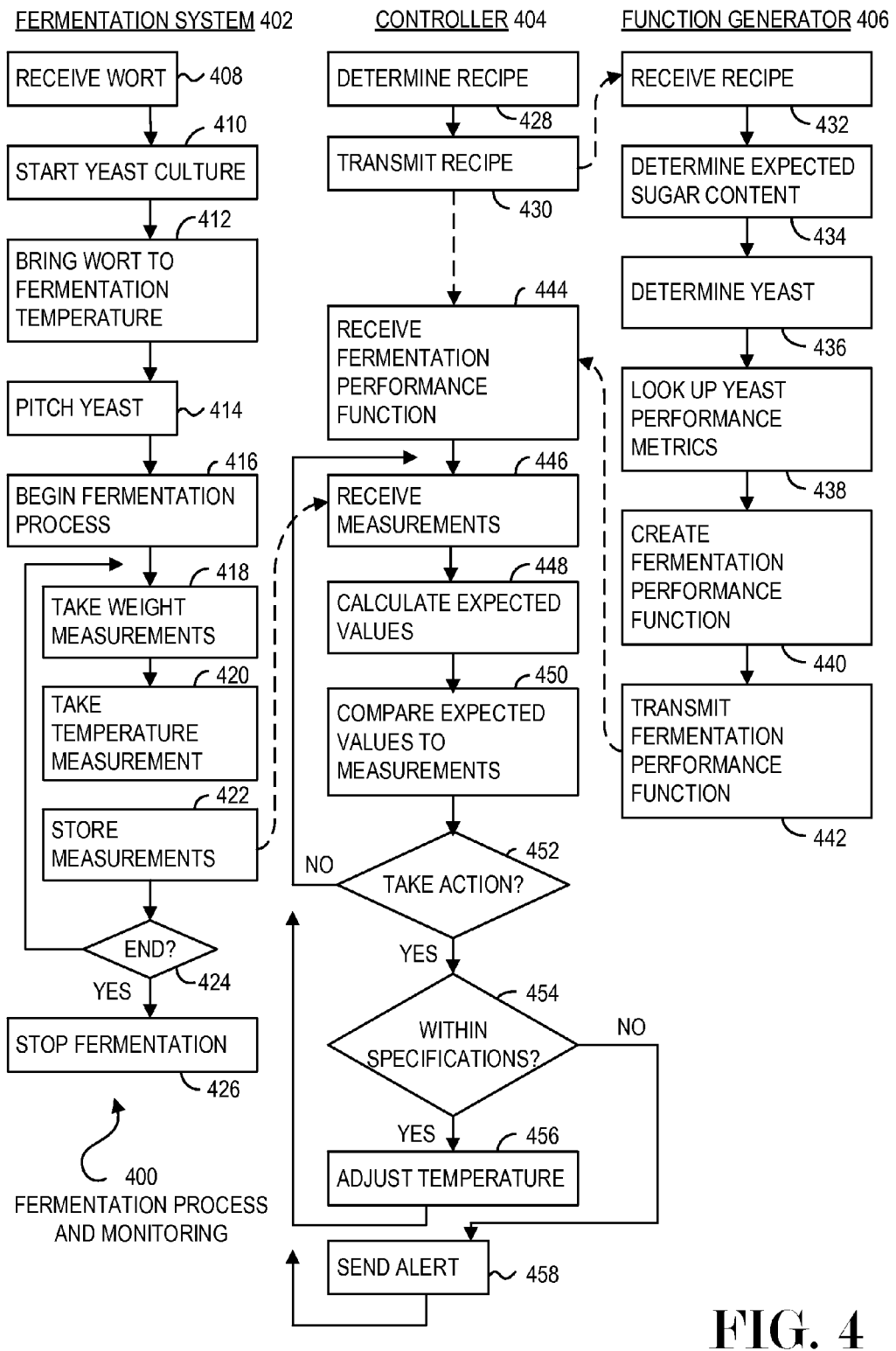
FIG. 4 is a flowchart illustration of an embodiment showing methods performed by a fermentation system, a controller, and a function generator.

FIG. 4 is a flowchart illustration of an embodiment 400 showing functions that may be performed by various components of a system with fermentation monitoring. Operations of a fermentation system 402 may be illustrated in the left hand column, operations of a controller 404 may be illustrated in the center column, and operations of a function generator 406 may be illustrated in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The example of embodiment 400 are merely one way that the various functions of a system may be separated into different devices. Other embodiments may combine or separate various functions into different components, services, devices, or other classification.

The fermentation system 402 may illustrate operations that may be performed by hardware that handles the fermenting liquid. An example of such hardware may be the system 102 of FIG. 1. The controller 404 may be a microprocessor-based controller that may interface with the fermentation system 402. The function generator 406 may be a service, for example, that may create and manage fermentation performance functions.

The operations of the fermentation system 402 may include receiving wort in block 408. The wort may be liquid that may be fermented using yeast. A yeast culture may be started in block 410, and after the wort has been brought to a fermentation temperature in block 412, the yeast may be pitched or added to the wort in block 414, beginning the fermentation process in block 416.

During the fermentation process, a weight measurement may be taken in block 418 along with a temperature measurement 420. The measurements may be stored in block 422 and, providing that the fermentation process is continuing in block 424, the process may return to block 418. The fermentation process may be determined to have completed in block 424 and the fermentation process may be stopped in block 426.

In a manual version of the fermentation system 402, a human operator may record the weight measurement in block 418 and temperature measurement in block 420 and store the measurements in block 422 using a hand written paper, for example. In an automated version of the fermentation system 402, the measurements may be taken periodically and transmitted to an automated controller 404.

Many fermentation systems may include a thermostat or other temperature management system. Such systems may control the temperature of the fermenting liquid and may use a thermocouple or other temperature measuring instrument as an input to a closed-loop temperature control. In the example of embodiment 100, such a closed-loop temperature control may be used to regulate the temperature of a refrigerated compartment, and, in some cases, a second closed-loop temperature control system may be used to control a heating element that may be applied to a fermenting vessel.

A controller 404 may be an automated device that may monitor a fermentation process. The controller 404 may perform a monitoring function, which may include determining when the fermentation process may have deviated from its expected progress as well as when the fermentation process has completed.

In some cases, the controller 404 may be able to adjust various parameters that may affect the fermentation process, such as temperature control. Adjustments to temperature may cause a yeast culture to increase or decrease propagation, and may be one way to adjust the progress of a fermentation process.

The controller 404 may determine a recipe in block 428. In some cases, a user may enter a recipe through a user interface. In other cases, a recipe may be transmitted from a brewing system which may have been used to produce the wort being fermented.

The recipe may be transmitted in block 430 to a function generator 406, which may receive the recipe in block 432. The function generator 406 may be a device or service that may manage fermentation performance functions. In the example of embodiment 400, the function generator 406 may determine an appropriate fermentation performance function and may transmit it to the controller 404.

The function generator 406 may receive a recipe in block 432 and determine an expected sugar content of the wort in block 434. The yeast may be determined in block 436 from the recipe and the yeast's performance metrics may be determined in block 438. From the sugar content and the yeast information, the function generator 406 may determine a fermentation performance function in block 440 and may transmit the function to the controller 404 in block 442.

The controller 404 may receive the fermentation performance function in block 444.

The controller 404 may receive measurements in block 446 from the fermentation system 402. A set of expected values may be calculated in block 448. The expected values may be calculated from the fermentation performance function. A comparison may be made in block 450 between the expected and measured values, and a determination may be made in block 452 to take action or not.

The determination to take action in block 452 may be made by analyzing the variance between expected and measured values of the fermentation process. When an action may be taken in block 452, if the process may be within specifications for maintaining or adjusting control in block 454, a temperature adjustment may be made in block 456. If the process may be outside the specifications in block 454, an alert may be sent in block 458.

The alert of block 458 may be a message that may be transmitted to a user. In some cases, the alert of block 458 may cause a corrective action to be taken, such as shutting down a function or the entire system.

Figure 5:
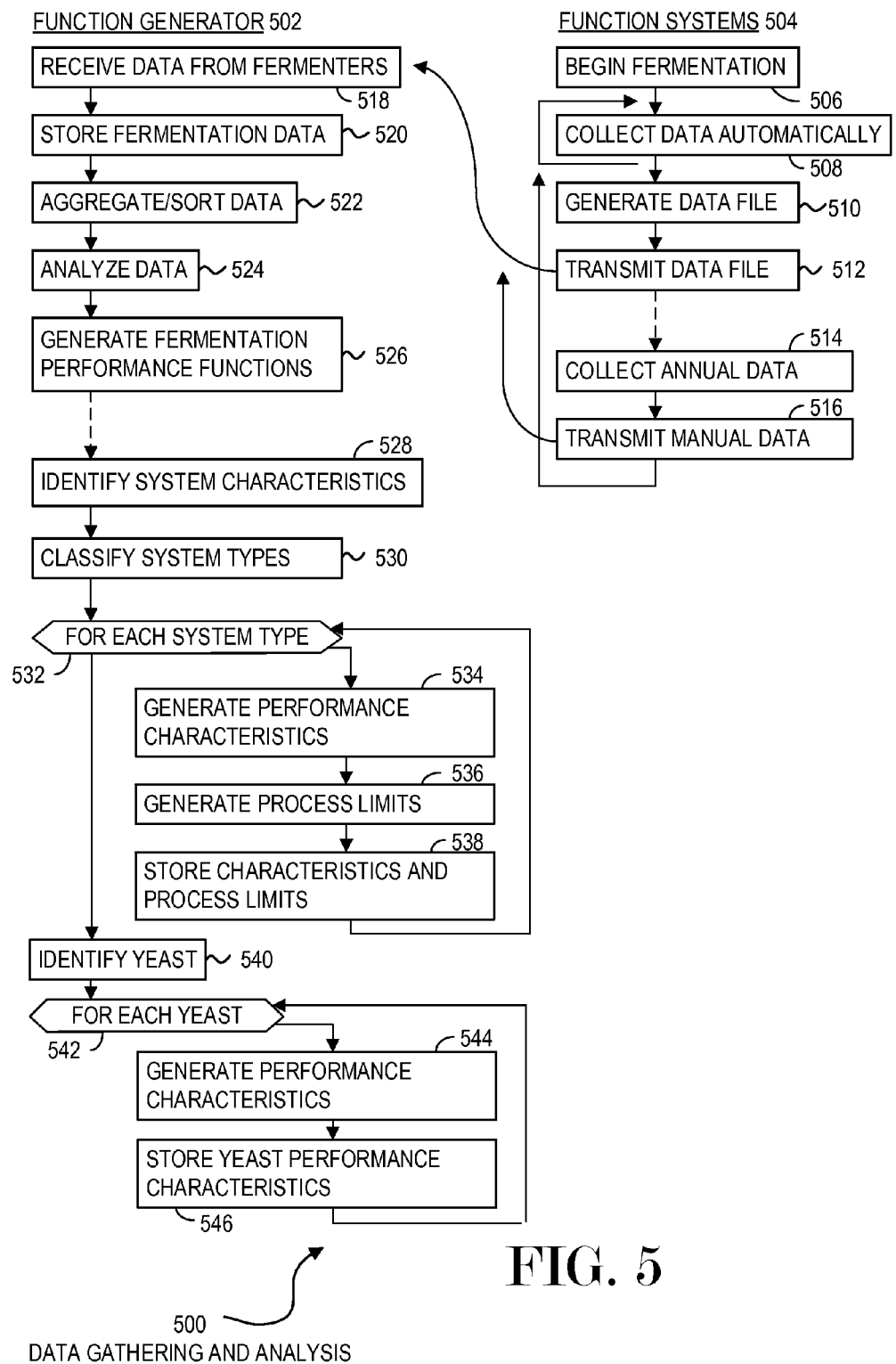
FIG. 5 is a flowchart illustration of an embodiment showing methods performed by a function generator and various fermentation systems.

FIG. 5 is a flowchart illustration of an embodiment 500 showing functions that may be performed by various components of a system with fermentation monitoring. Operations of a function generator 502 may be illustrated in the left hand column, and operations of a fermentation system 504 may be illustrated in the right hand column. In the example of embodiment 500, the operations of a fermentation system and its controller are illustrated as a single fermentation system 504.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The example of embodiment 500 is merely one way that the various functions of a system may be separated into different devices. Other embodiments may combine or separate various functions into different components, services, devices, or other classification.

A fermentation system 504 may begin fermentation in block 506 and may collect some data automatically in block 508. At some point, a data file may be generated in block 510 and transmitted in block 512. The data file may contain a single reading, or may contain multiple readings. The data may include items such as temperature, time, weight of a fermenting vessel, or other data.

The fermentation system 504 may have a mechanism to capture manually collected data. In such a case, the system may collect manual data in block 514 and may transmit the manually collected data in block 516. An example of manual data may be a specific gravity measurement, visual report, or other data.

A function generator 502 may receive data from fermenters in block 518, and may store the data in block 520.

The function generator 502 may aggregate and sort data in block 522, analyze data in block 524, and may generate fermentation performance functions in block 526 that may represent the collected data and may be used to calculate expected parameters. The analysis of block 524 may include primary component analysis, regression analysis, curve fitting analysis, or any other type of mathematical analysis of the data which may generate a function that may represent the data.

An example of such analysis may include identifying various system characteristics in block 528. The system characteristics may be metadata or other information that may describe an individual fermentation system. Examples may include a make and model number, system capacity, system type, usage, environment in which the fermentation system operates, or any other parameter that may describe a fermentation system.

A number of system types may be identified in block 530, and for each system type in block 532, a set of performance characteristics may be generated in block 534, along with a set of process limits in block 536. The performance characteristics may be factors that describe how the system may function, while the process limits may describe the limits of the system. In some cases, the process limits may include operating conditions for sending alerts or taking additional actions.

Another example of the analysis may include identifying yeasts in block 540. For each yeast in block 542, a set of performance characteristics may be determined in block 544 and stored in block 546. The yeast performance characteristics may describe the yeast activity based on a starting sugar level, temperature, and other parameters. In some cases, the yeast performance characteristics may include an expression of increased or decreased performance based on temperature or other controllable inputs.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system for monitoring a fermentation process in a fermentation vessel, said system comprising:
    a control system;
    a fermentation system housing a scale configured to receive said fermentation vessel and having an output connected to said control system;
    a hardware platform comprising a computer processor; said control system executing on said hardware platform configured to:
    determine a starting weight value of said fermenting vessel;
    determine a starting time for said fermentation process using said fermenting vessel;
    receive a weight measurement representing a weight of said fermenting vessel at a time which is sometime after the starting time of said fermentation process, using said scale;
    determine a calculated anticipated weight for said fermenting vessel, said calculated anticipated weight being determined at least based on said starting weight value and said starting time;
    compare said weight measurement to the calculated anticipated weight; and
    in response to determining that said calculated anticipated weight is a predetermined expected final weight, determine that said fermentation process has completed based on said predetermined expected final weight.

2. The system of claim 1, said control system further configured to:
    determine a target temperature;
    transmit said target temperature to a temperature control circuit, said temperature control circuit controlling a temperature of said fermenting vessel.

3. The system of claim 2, said control system further configured to:
    in response to determining that said calculated anticipated weight is not said predetermined expected final weight, determine a deviation from said calculated anticipated weight.

4. The system of claim 3, said control system further configured to:
    adjust said target temperature based at least in part from said deviation from said calculated anticipated weight.

5. The system of claim 4, said control system further configured to:
    transmit a recipe description to a recipe analyzer; and
    receive a fermentation expression for said recipe description, said fermentation expression being used to determine said calculated anticipated weight.

6. The system of claim 5, said recipe analyzer being a remote device, said system having a network interface configurable to connect with said remote device.

7. The system of claim 1, said calculated anticipated weight being expressed in a fermentation function, said fermentation function being a function having a time input.

8. The system of claim 7, said fermentation function being received from a recipe analyzer.

9. The system of claim 1, wherein the fermentation system further comprising:
    a temperature controlled compartment configured to house said fermentation vessel, said temperature controlled compartment comprising a temperature control circuit connected to said control system.

* * * * *